US012794373B2

(12) United States Patent
Cohen

(10) Patent No.: US 12,794,373 B2
(45) Date of Patent: Nov. 10, 2026

(54) MULTIMODE CURRENT MODE CONTROL FOR PWM CONVERTERS

(71) Applicant: TEXAS INSTRUMENTS INCORPORATED, Dallas, TX (US)

(72) Inventor: Isaac Cohen, Manchester, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 174 days.

(21) Appl. No.: 18/308,738

(22) Filed: Apr. 28, 2023

(65) Prior Publication Data

US 2024/0364223 A1 Oct. 31, 2024

(51) Int. Cl.
*H02M 3/335* (2006.01)
*H02M 1/00* (2006.01)

(52) U.S. Cl.
CPC ..... *H02M 3/33523* (2013.01); *H02M 1/0025* (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491
See application file for complete search history.

(56) References Cited

U.S. PATENT DOCUMENTS

| | | | | |
|---|---|---|---|---|
| 7,928,705 | B2 * | 4/2011 | Hooijschuur | H02M 3/07 323/272 |
| 7,936,160 | B1 | 5/2011 | Sheehan | |
| 9,143,095 | B2 * | 9/2015 | Takida | H03F 3/181 |
| 9,602,001 | B1 * | 3/2017 | Hung | H02M 3/158 |
| 9,716,436 | B2 * | 7/2017 | Xu | H02M 3/1588 |
| 2009/0322299 | A1 * | 12/2009 | Michishita | H02M 3/156 323/282 |
| 2010/0027298 | A1 | 2/2010 | Cohen | |

(Continued)

OTHER PUBLICATIONS

PCT Search Report mailed Aug. 14, 2024.

(Continued)

*Primary Examiner* — Jeffrey A Gblende
(74) *Attorney, Agent, or Firm* — Charles F. Koch

(57) ABSTRACT

The techniques and circuits, described herein, include solutions for multimode current control for pulse width modulation (PWM) converters. In some aspects, a slope control circuit is used to simulate a current through an inductor during a discharging phase as a voltage across a switching capacitor. A slope-control voltage is used to modify the slope of the simulated current waveform relative to an actual inductor current waveform. Based on if a magnitude of the modified slope is greater than, less than, or equal to the actual slope, the converter may be selectively operated in continuous conduction mode (CCM), discontinuous conduction mode (DCM), or transition mode (TM) respectively.

21 Claims, 8 Drawing Sheets

(56) References Cited

U.S. PATENT DOCUMENTS

| | | | | |
|---|---|---|---|---|
| 2020/0144923 | A1* | 5/2020 | Cohen | H02M 3/33507 |
| 2024/0333152 | A1* | 10/2024 | Wang | H02M 3/156 |

OTHER PUBLICATIONS

Smart Ctrl. Control design for power electronics. Peak Current Mode Control—Tutorial—Dec. 2018.

Tomas Hudson, "The difference between CCM And DCM Explained", published in 2022.

Raghavan Sampath, "Digital Peak Current Mode Control of Buck Converter Using MC56F8257 DSC", Published May 2013.

"DC to DC Buck Converter Tutorial & Diagram", Published 11, 29, 2001.

* cited by examiner

MULTIMODE CURRENT MODE CONTROL FOR PWM CONVERTERS

BACKGROUND

Direct current (DC) to DC converters can be used to perform various functions in electronics circuits such as voltage stepping up/down, voltage regulation, etc. Typically, DC to DC converters include one or more switches, and a pulse width modulation (PWM) signal may be used to control operation of the one or more switches to control the switching frequency. The switching frequency and input voltage of the DC to DC converter affect an output voltage of the DC-to-DC converter.

SUMMARY

In one example, a circuit includes an inductor arranged along a first current path. The inductor comprises a first terminal and a second terminal. A current sensing circuit is arranged in series with the inductor along the first current path. A first switch is coupled between the inductor and the current sensing circuit. A voltage sensing circuit comprises first and second inputs coupled to the first and second terminals of the inductor respectively. A feedback path extends from an output of the voltage sensing circuit to a control terminal of the first switch. A slope control circuit is arranged along the feedback path and coupled to the output of the voltage sensing circuit, and the slope control circuit comprises a switching output. A peak current control circuit is coupled to an output of the current sensing circuit, and the peak current control circuit comprises a switching output. A switching control circuit comprises a first input coupled to the switching output of the slope control circuit, a second input coupled to the switching output of the peak current control circuit, and a first output coupled to the control terminal of the first switch.

In another example, a circuit includes a voltage sensing circuit comprising first and second inputs coupled to first and second terminals of an inductor. A current sensing circuit is arranged in series with the inductor, and a first switch is arranged between the inductor and the current sensing circuit. A peak current control circuit is coupled to an output of the current sensing circuit, and the peak current control circuit is configured to selectively open the first switch via a switching control circuit based on a sensed current a peak-current-control voltage. A slope control circuit is coupled to an output of the voltage sensing circuit, and the slope control circuit is configured to selectively close the first switch via the switching control circuit based on a sensed voltage and a slope-control voltage.

In another example, a method for controlling a pulse width modulation (PWM) converter includes, during a first discharging phase: sensing a voltage across an inductor and charging a sampling capacitor based on the sensed voltage, discharging a switching capacitor at a rate based on a voltage stored on the sampling capacitor and a slope-control voltage, and initiating a charging phase in response to a voltage on the switching capacitor falling below a threshold value, wherein an operation mode of the PWM converter is based on the slope-control voltage.

DETAILED DESCRIPTION

The drawings are not drawn to scale.

DC to DC converters, such as pulse width modulation (PWM) converters, are utilized in a wide variety of electronic circuits due to their ability to step up/down and regulate DC voltages. A PWM converter may comprise a voltage input, inductor, capacitor, diode, and one or more switches. During operation, the one or more switches are opened and closed at a high frequency; the operation of the one or more switches in combination with the diode are used to control current paths within the PWM converter and charge/discharge the inductor and the capacitor. An output voltage is generated across the capacitor based on the switching frequency and a topology of the PWM converter. PWM converters may come in a variety of topologies such as buck, boost, buck-boost, flyback, etc., that provide a variety of relationships between the voltage of the input and the output. The placement of the voltage input, inductor, capacitor, diode, and one or more switches may vary based on the topology.

Figure 1:
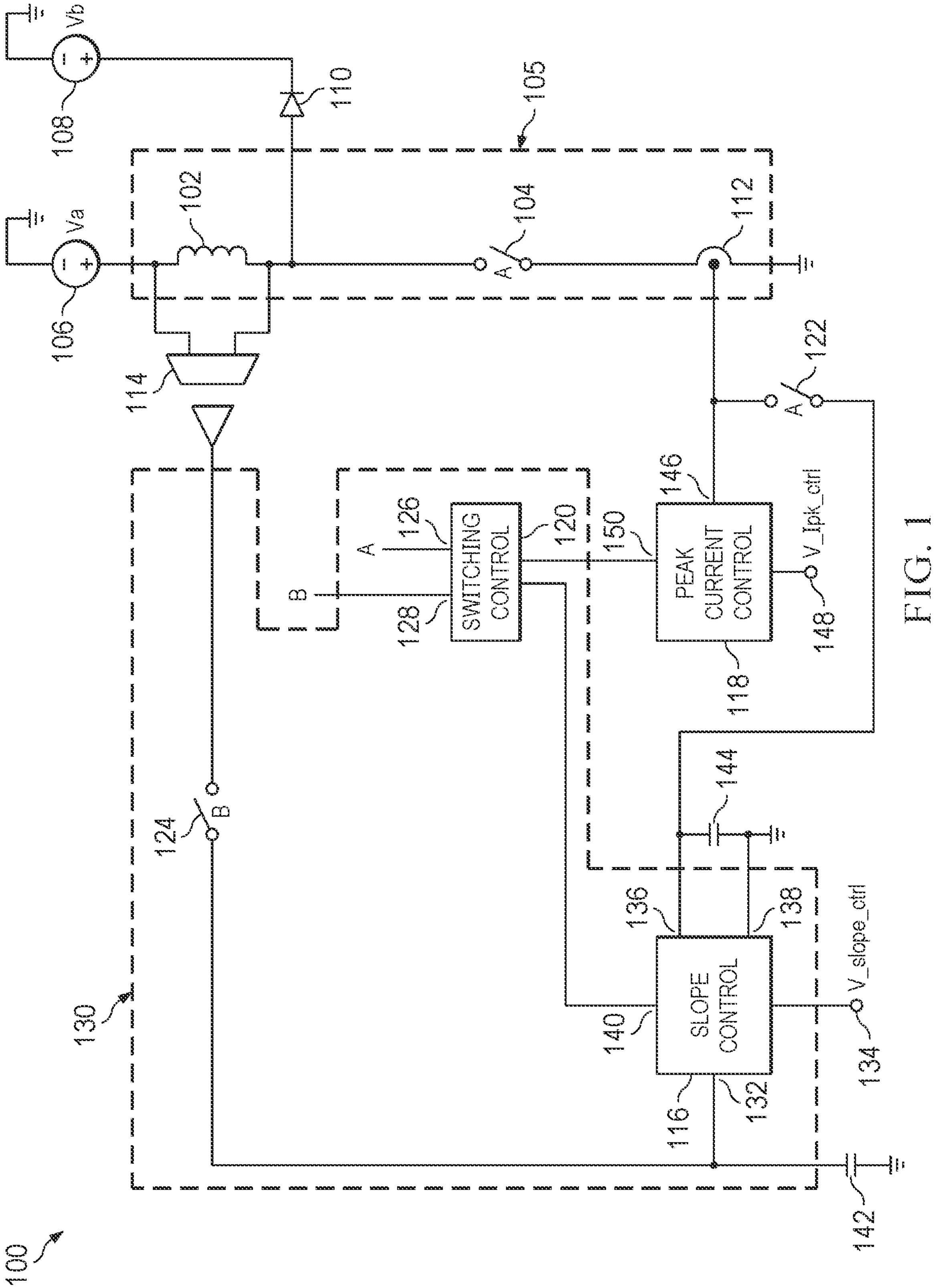
FIG. 1 is a circuit schematic of a pulse width modulation (PWM) controller including a slope control circuit and a peak current control circuit in accordance with some aspects of the present disclosure.

FIG. 1 illustrates a PWM controller 100, which may be coupled to/used to control a PWM converter. The PWM controller 100 may be used with any PWM topology, and the PWM controller 100 has been generalized in FIG. 1 to be applicable to any PWM topology.

Illustrated is an inductor 102 and a first switch 104 of the PWM converter arranged along a first current path 105. The switching operation of PWM converters may be generally divided into two phases: a charging phase and a discharging phase. During the charging phase, the first switch 104 is closed. A voltage 106 "Va" is applied across the inductor 102 (e.g., by the voltage input), and the inductor 102 begins charging. Eventually, the PWM converter switches to the discharging phase, where the first switch 104 is opened and current flows from the inductor 102 through a diode 110. More particularly, a difference "Va-Vb" between the voltage 106 "Va" and a voltage 108 "Vb" is applied across the inductor 102 (e.g., based on the voltage input and/or voltage output of the PWM converter), and the inductor 102 begins discharging. Depending on the value of the current present in the inductor 102 at the end of the discharging phase, the PWM converter may be defined as operating in continuous conduction mode (CCM), discontinuous conduction mode (DCM), or transition mode (TM). In CCM, the discharging phase ends before the inductor 102 is fully discharged, thus the current through the inductor 102 is never zero. In DCM, the discharging phase ends after the inductor 102 has been fully discharged, thus the current through the inductor 102 reaches zero during the discharging phase and remains at zero until the next charging phase. In TM, the discharging phase ends upon fully discharging the inductor 102, thus the current through the inductor 102 is only zero momentarily. Note the voltage 106 "Va" and the voltage 108 "Vb" have been generalized to be applicable to any PWM topology. The exact relationship between the voltage 106 "Va", the voltage 108 "Vb", and the input/output voltage of the PWM converter will vary based on the specific PWM topology.

In an ideal scenario, an output load of the PWM converter would remain perfectly stable. However, in reality, the load of the PWM converter will vary according to actual conditions. For example, if the system is in an idle state vs an active state the power draw of the load may vary accordingly. In order to maintain a regulated DC output for a varying load, an intelligent method of PWM converter switching control is desired. One such method is peak current mode control. During peak current control, a current through an inductor (e.g., 102) is monitored during the charging phase and compared to a reference. Once the current through the inductor exceeds the reference, the discharging phase is initiated. Switching between the charging and discharging phases is controlled, for example, by a clock, where the frequency of the clock controls the mode of operation (e.g., CCM, DCM, or TM). Therefore, the peak current through the inductor and the output of the PWM converter are both regulated.

However, peak current mode control presents several disadvantages. For example, when operating in CCM, sub-harmonic oscillations may appear when the duty cycle of the clock exceeds 50%. A compensating ramp may be added to the current signal to suppress this oscillation, however, this negatively impacts the current limit characteristics of the converter as well as increasing circuit complexity. Furthermore, in order to switch between CCM, DCM, and TM in peak current mode control circuits, the frequency of the clock must be changed, which may cause undesirable effects such as generating transients, requiring time for the circuit to adjust, etc.

Accordingly, the present disclosure provides circuitry and corresponding techniques for regulating PWM converters using hysteretic regulation of inductor current (flux) in order to eliminate noise and achieve seamless transitions between DC-to-DC converter modes of operation. In some aspects, a voltage sensing circuit 114 is used to monitor a voltage across the inductor 102 during the discharging phase, and a slope control circuit 116 coupled to the voltage sensing circuit 114 is used to simulate a current through the inductor 102. Based on a control voltage V_slope_ctrl provided to the slope control circuit 116, the slope of the simulated current may be adjusted, and the charging phase may be initiated before, after, or the instant that the inductor 102 is fully discharged, which allows precise control to selectively operate the converter in CCM, DCM, or TM respectively.

The PWM controller 100 further comprises a current sensing circuit 112 arranged in series with the inductor 102, which is used for measuring a current through the inductor 102 during the charging phase. A peak current control circuit 118 may initiate the discharging phase when the measured current exceeds a peak current value V_Ipk_ctrl. The charging and/or discharging phases may be initiated via a switching control circuit 120, which controls the first switch 104, a second switch 122, and a third switch 124. A first output 126 of the switching control circuit 120 provides a first signal "A" to the first switch 104 and the second switch 122. A second output 128 of the switching control circuit 120 provides a second signal "B" to the third switch 124.

A feedback path 130 extends from an output of the voltage sensing circuit 114 to a control terminal of the first switch 104. The slope control circuit 116 is arranged along the feedback path 130 and comprises a first voltage input terminal 132, a slope-control voltage input terminal 134, a first discharging terminal 136, a second discharging terminal 138, and a switching output 140. The first voltage input terminal 132 is coupled to the output of the voltage sensing circuit 114 via the third switch 124, and further coupled to a sampling capacitor 142. The first and second discharging terminals 136, 138 are coupled to a switching capacitor 144. The second switch 122 is coupled between an output of the current sensing circuit 112 and the first discharging terminal 136.

The peak current control circuit 118 comprises a first voltage input terminal 146, a peak-current-control voltage input terminal 148, and a switching output 150. The first voltage input terminal 146 is coupled to the output of the current sensing circuit 112.

The switching control circuit 120 further comprises a first input coupled to the switching output 140 of the slope control circuit 116 and a second input coupled to the switching output 150 of the peak current control circuit 118.

In some aspects, the slope control circuit 116 and the peak current control circuit 118 are configured to set a voltage on switching capacitor 144 based on a current through the inductor 102. Thus, the voltage on 144 can "track" the current through the inductor. For the sake of simplicity and ease of explanation, the current sensing circuit 112 and the voltage sensing circuit 114 will be described as having a gain equal to 1 (e.g., the current sensing circuit 112 outputs a voltage in Volts numerically equal to the sensed current in Amps, and the voltage sensing circuit 114 outputs a voltage numerically equal to the voltage across the inductor 102). However, it is appreciated that other gain values (e.g., less than 1, greater than 1) may be used without departing from the scope of the present disclosure.

During the charging phase, the first switch 104 and the second switch 122 are closed, and the third switch 124 is opened. The inductor is charged by the voltage 106 "Va". The current sensing circuit 112 outputs on 146 a voltage in Volts equal to the current in Amps through the current sensing circuit 112 (e.g., the same current that flows through the inductor 102). Because the second switch 122 is closed, the switching capacitor 144 is charged by the output of the current sensing circuit 112 while the inductor 102 is being charged. Thus, the voltage across the switching capacitor 144 in Volts is numerically equal to the current through the inductor 102 in Amps. The current through the inductor 102 increases as the inductor 102 is charged. Eventually, the peak current control circuit 118 will detect that the voltage at the first voltage input terminal 146 exceeds a voltage V_Ipk_ctrl at the peak-current-control voltage input terminal 148 (e.g., the current through the inductor has exceeded some peak current, where the peak current is controlled/set by V_Ipk_ctrl). The peak current control circuit 118 indicates that the peak current has been exceeded to the switching control circuit 120 via the switching output 150. In response, the switching control circuit 120 switches to the discharging phase.

At the beginning of the discharging phase, the switching control circuit 120 opens the first switch 104 and the second switch 122, and closes the third switch 124 for a sampling duration. During the sampling duration, the voltage across the inductor 102 is provided to the sampling capacitor 142 by the voltage sensing circuit 114. The slope control circuit 116 is configured to, via the first discharging terminal 136 and the second discharging terminal 138, discharge the switching capacitor 144 based on a voltage at the first voltage input terminal 132 (e.g., the voltage of the sampling capacitor 142) and a voltage V_slope_ctrl at the slope-control voltage input terminal 134. The voltage on the sampling capacitor 142 is the sampled voltage of the inductor 102, which provides information about the discharge rate (e.g., rate of change of current) of the inductor, since the relationship between inductor voltage and discharge rate follows $$V_L = L\frac{di}{dt}.$$

The voltage at the first voltage input terminal 132 is used as a baseline to discharge the switching capacitor 144 at the same rate that the inductor 102 is being discharged. The switching capacitor 144 and the inductor 102 will be fully discharged at the same time, such that a current through the inductor 102 tracks a voltage across the switching capacitor 144. In addition, the voltage V_slope_ctrl is used to modify the rate at which the switching capacitor 144 is discharged. For example, if V_slope_ctrl is 1 then the switching capacitor 144 is discharged at the same rate as the inductor 102, if V_slope_ctrl<1 then the switching capacitor 144 is discharged at a slower rate than the inductor 102, and if V_slope_ctrl>1 then the switching capacitor 144 is discharged at a faster rate than the inductor 102. Upon the switching capacitor 144 being fully discharged, the slope control circuit 116 sends a signal to the switching control circuit 120 via the switching output 140, and the switching control circuit 120 switches back to the charging phase.

Because the voltage on the switching capacitor 144 mimics the current through the inductor 102, by controlling the slope at which the voltage of the switching capacitor 144 changes, the PWM controller 100 controls when the charging phase is initiated in a known manner relative to the actual current through the inductor 102. For example, if V_slope_ctrl>1, then the voltage on 144 current reaches a predetermined value (e.g., 0) before the actual inductor current, thus the charging phase is initiated before the actual inductor current reaches the predetermined value (e.g., 0), and the converter operates in CCM. If V_slope_ctrl<1, then the voltage on 144 reaches the predetermined value (e.g., 0) after actual inductor current, thus the charging phase is initiated after the actual inductor current reaches the predetermined value (e.g., 0), and the converter operates in DCM. If V_slope_ctrl=1, then the voltage on 144 reaches the predetermined value (e.g., 0) at the same time as the actual inductor current, thus the charging phase is initiated upon the actual inductor current reaching the predetermined value (e.g., 0), and the converter operates in TM. Although the value of 1 is used as an example, alternative threshold values may also be used. The use of V_slope_ctrl allows for precise control of PWM converter operating modes by modeling inductor current as a voltage across a capacitor for switching control. Furthermore, the voltage on 144 (and therefore the operating mode) can be adjusted seamlessly by changing V_slope_ctrl, without causing undesired subharmonic oscillations, transients, etc.

The exact placement of the inductor 102, first switch 104, diode 110, capacitor (not illustrated), and voltage input (not illustrated, represented by Va and Vb) within the PWM converter may vary based on the topology of the PWM converter. Furthermore, the placement of the current sensing circuit 112 may allow the current sensing circuit 112 to measure a current through the inductor 102 during the charging phase, and the placement of the voltage sensing circuit 114 may allow the voltage sensing circuit 114 to measure a voltage across the inductor 102 during the discharging phase. The placement of the current sensing circuit 112 and the voltage sensing circuit 114 may vary accordingly based on the topology.

Figure 2:
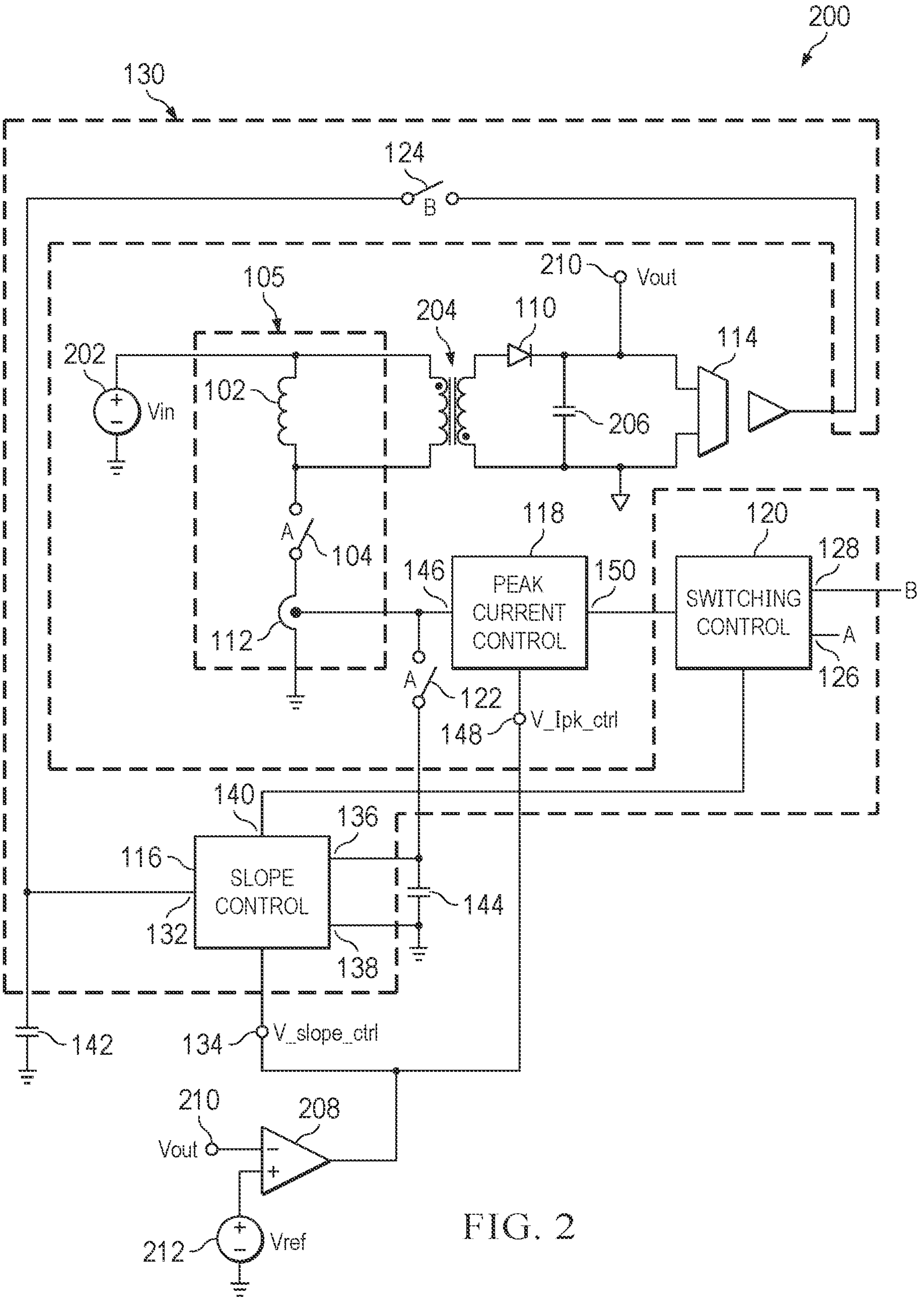
FIG. 2 is a circuit schematic of a flyback converter including a PWM controller with a slope control circuit and a peak current control circuit in accordance with some aspects of the present disclosure.

FIG. 2 illustrates a circuit 200 including the PWM controller of FIG. 1 in the context of a flyback converter. The flyback converter comprises a voltage input 202, the inductor 102, a transformer 204, the diode 110, and an output capacitor 206. The inductor 102 is merely shown for illustrative purposes, and represents the magnetizing inductance of the transformer 204.

The current sensing circuit 112 is connected in series with the inductor 102. The voltage sensing circuit 114 is connected across the output capacitor 206, which varies slightly from FIG. 1 in order to maintain a 1:1 ratio between the measured current and the measured voltage used for charging/discharging the switching capacitor 144 respectively. For example, if the transformer 204 has a turns ratio of 1:10, the voltage ratio of the transformer will be 1:10 and the current ratio of the transformer will be 10:1. By placing the current sensing circuit 112 on a first side of the transformer 204 and the voltage sensing circuit 114 on a second side of the transformer 204 opposite to the first side, the ratio of the charging and discharging rates of the switching capacitor 144 is not affected by the presence of the transformer 204, and the functionality of the circuit is substantially the same as described with reference to FIG. 1. As an alternative, the current sensing circuit 112 and the voltage sensing circuit 114 may be placed on a same side of the transformer 204, however, the ratio of the gains of the current sensing circuit 112 and the voltage sensing circuit 114 must be 1:10 (or 10:1, depending on the side of the transformer). For different turns ratios, the gain ratio may be adjusted accordingly.

In some aspects, the circuit 200 further comprises an error amplifier 208. The error amplifier 208 has a first input, a second input, and an output. The first input is coupled to an output voltage 210 Vout that appears on the output capacitor 206. The second input is coupled to a reference voltage 212, and the output is coupled to the slope-control voltage input terminal 134 and the peak-current-control voltage input terminal 148. The error amplifier 208 is configured to compare the output voltage 210 to the reference voltage 212 and adjust the slope-control and peak-current-control accordingly to regulate the output voltage 210. For example, a change in the load may cause a drop in the output voltage 210. In response, the output of the error amplifier 208 increases, causing an increase in the peak current via the peak-current-control voltage input terminal 148 and causing the converter to operate in CCM via the slope-control voltage input terminal 134. The increased peak current as well as the operation in CCM cause increased power delivery to the load, which compensates for the voltage drop at the output. Similarly, an increase in the output voltage 210 may cause the output of the error amplifier 208 to decrease, causing a decrease in the peak current and causing the converter to operate in DCM in order to deliver less power to the load and compensate for the voltage increase at the output. Although the present example includes the converter switching between DCM and CCM, alternative examples may not include the converter switching between DCM and CCM. For example, the converter is already in CCM and moves “further into” CCM by initiating the charging phase earlier (e.g., when inductor current is higher) in response to the increased power draw by the load.

Figure 3:
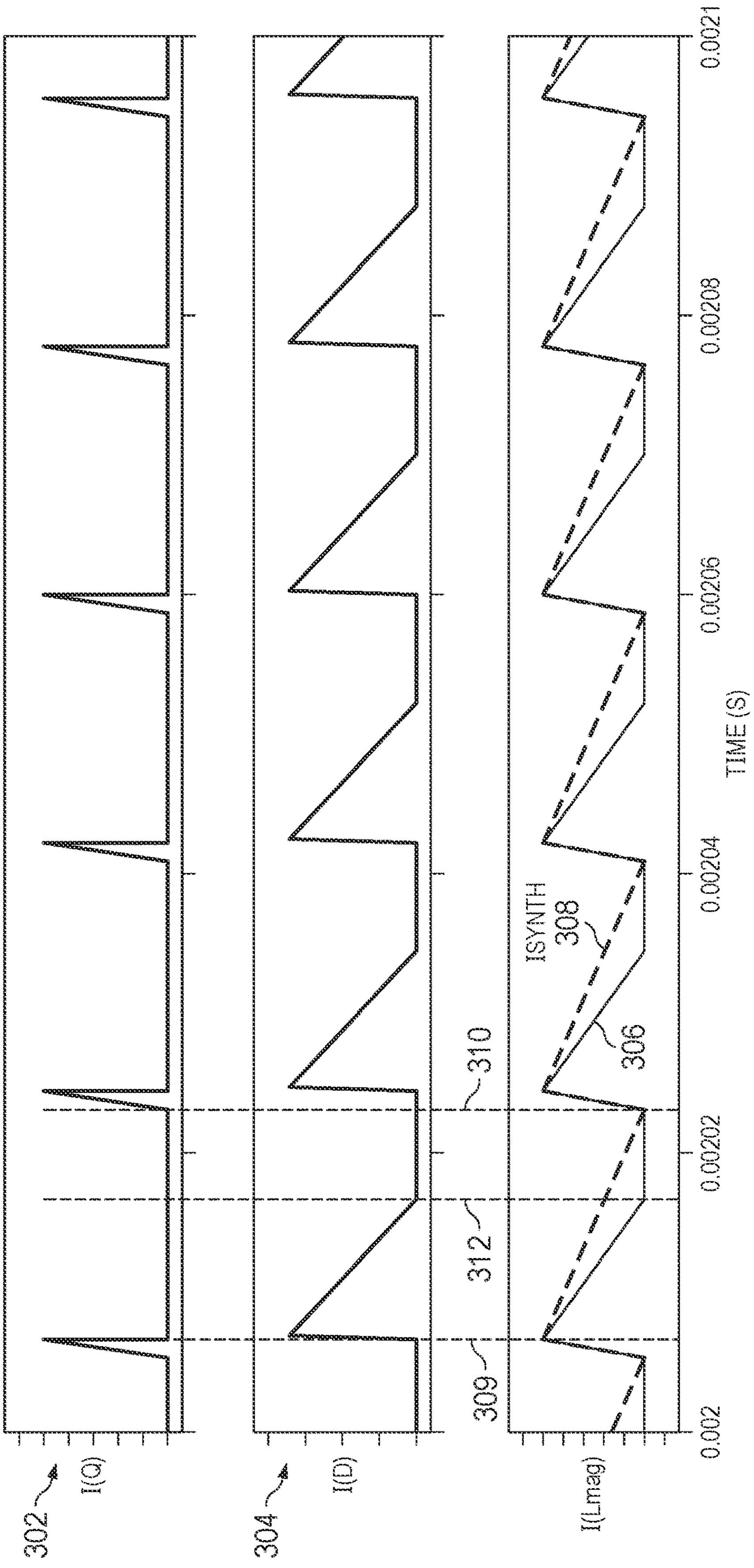
FIG. 3 is a waveform diagram illustrating discontinuous conduction mode (DCM) operation of a flyback converter including a PWM controller with a slope control circuit and a peak current control circuit in accordance with some aspects of the present disclosure.

FIG. 3 illustrates an example of a switch current waveform 302, a diode current waveform 304, an inductor current waveform 306, and a synthesized inductor current waveform 308 for a flyback converter operating in DCM in accordance with some aspects of the present disclosure. In some aspects, the synthesized inductor current waveform 308 is represented as a voltage across the switching capacitor 144. In some aspects, the flyback converter is the flyback converter described with reference to FIG. 2.

During the charging phase, the switch current waveform 302 mirrors the inductor current waveform 306. In addition, the switch current waveform 302 may mirror the synthesized inductor current waveform 308 during the charging phase. The synthesized inductor current waveform 308 is illustrated/described in the following figures as being identical to the inductor current waveform 306 during the charging phase for ease of explanation, however, it is also possible that the synthesized inductor current waveform 308 and the inductor current waveform 306 are proportional but have different magnitudes (e.g., based on gains of the current sensing circuit 112 and the voltage sensing circuit 114). At a first point in time 309, the switch is opened, initiating the discharging phase. This may occur, for example, in response to the current through the switch (and consequently, the inductor) exceeding a peak current value set by V_Ipk_ctrl.

During the discharging phase, the diode current waveform 304 mirrors the inductor current waveform 306. The magnitude of the slope of the synthesized inductor current waveform 308 is less than the magnitude of the slope of the inductor current waveform 306. This may be, for example, in response to V_slope_ctrl having a value less than 1. Consequently, the synthesized inductor current waveform 308 reaches 0 at a third point in time 310, after the inductor current waveform 306 reaches 0 at a second point in time 312. At time 310, the charging phase is initiated again. The switch conducts and the inductor charges, as illustrated by the switch current waveform 302 and the inductor current waveform 306 respectively. Because at the second point in time 310 the current through the inductor has already been 0 for some time, the converter operates in DCM.

Figure 4:
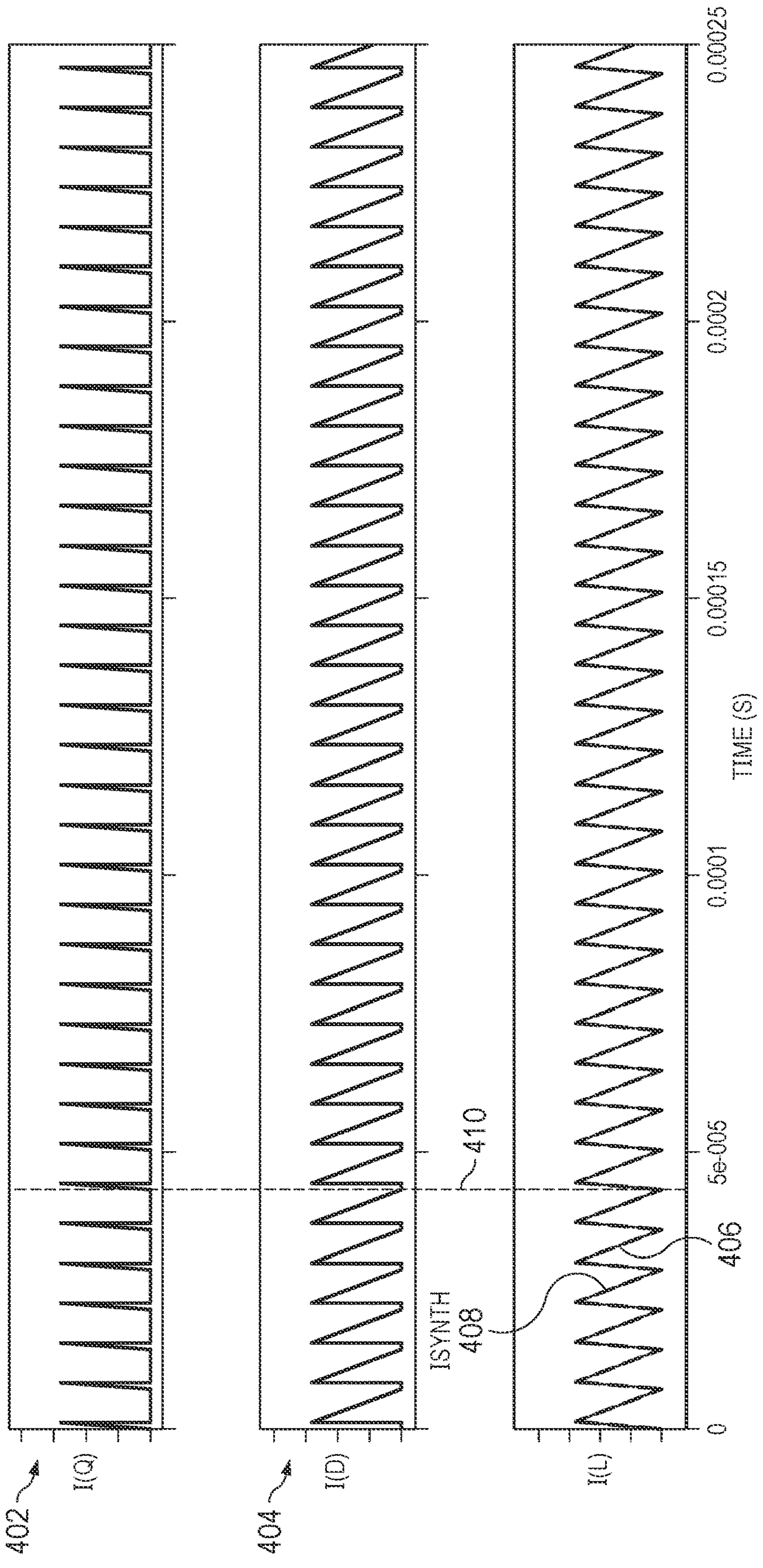
FIG. 4 is a waveform diagram illustrating transition mode (TM) operation of a flyback converter including a PWM controller with a slope control circuit and a peak current control circuit in accordance with some aspects of the present disclosure.

FIG. 4 illustrates an example of a switch current waveform 402, a diode current waveform 404, an inductor current waveform 406, and a synthesized inductor current waveform 408 for a flyback converter (e.g., the flyback converter from FIG. 2) operating in TM in accordance with some aspects of the present disclosure. In some aspects, the synthesized inductor current waveform 408 is represented as a voltage across the switching capacitor 144. Note, the inductor current waveform 406 and the synthesized inductor current waveform 408 are overlapping in this example, and are therefore illustrated as a single waveform.

During the charging phase, the switch current waveform 402 mirrors the inductor current waveform 406 and the synthesized inductor current waveform 408. During the discharging phase, the diode current waveform 404 mirrors the inductor current waveform 406 and the synthesized inductor current waveform 408. The inductor current waveform 406 and the synthesized inductor current waveform 408 reach 0 at a same point in time 410, and the charging phase is initiated. Thus, the charging phase is initiated at approximately the exact point in time 410 that the inductor is fully discharged, and the converter can be seen as operating in TM.

Figure 5:
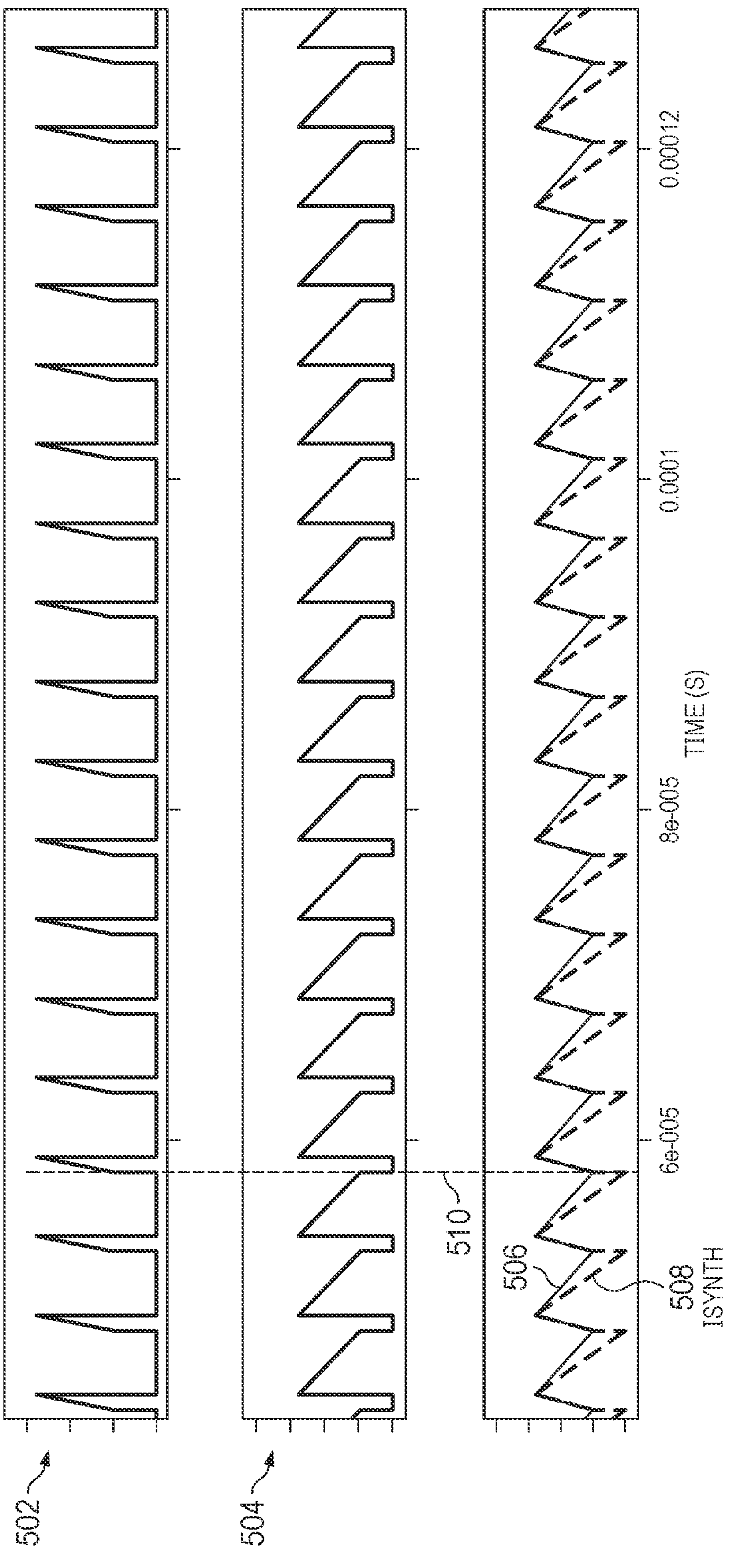
FIG. 5 is a waveform diagram illustrating continuous conduction mode (CCM) operation of a flyback converter including a PWM controller with a slope control circuit and a peak current control circuit in accordance with some aspects of the present disclosure.

FIG. 5 illustrates an example of a switch current waveform 502, a diode current waveform 504, an inductor current waveform 506, and a synthesized inductor current waveform 508 for a flyback converter (e.g., the flyback converter from FIG. 2) operating in CCM in accordance with some aspects of the present disclosure. In some aspects, the synthesized inductor current waveform 508 is represented as a voltage across the switching capacitor 144.

During the charging phase, the switch current waveform 502 mirrors the inductor current waveform 506 and the synthesized inductor current waveform 508. During the discharging phase, the diode current waveform 504 mirrors the inductor current waveform 506. The magnitude of the slope of the synthesized inductor current waveform 508 is greater than the magnitude of the slope of the inductor current waveform 506. This may be, for example, in response to V_slope_ctrl having a value greater than 1. Consequently, the synthesized inductor current waveform 508 reaches 0 at a first point in time 510, and the charging phase is initiated again. The charging phase is initiated before the inductor current waveform 506 reaches 0, in fact, the inductor current waveform 506 never reaches 0. Thus, the converter can be seen as operating in CCM.

Figure 6:
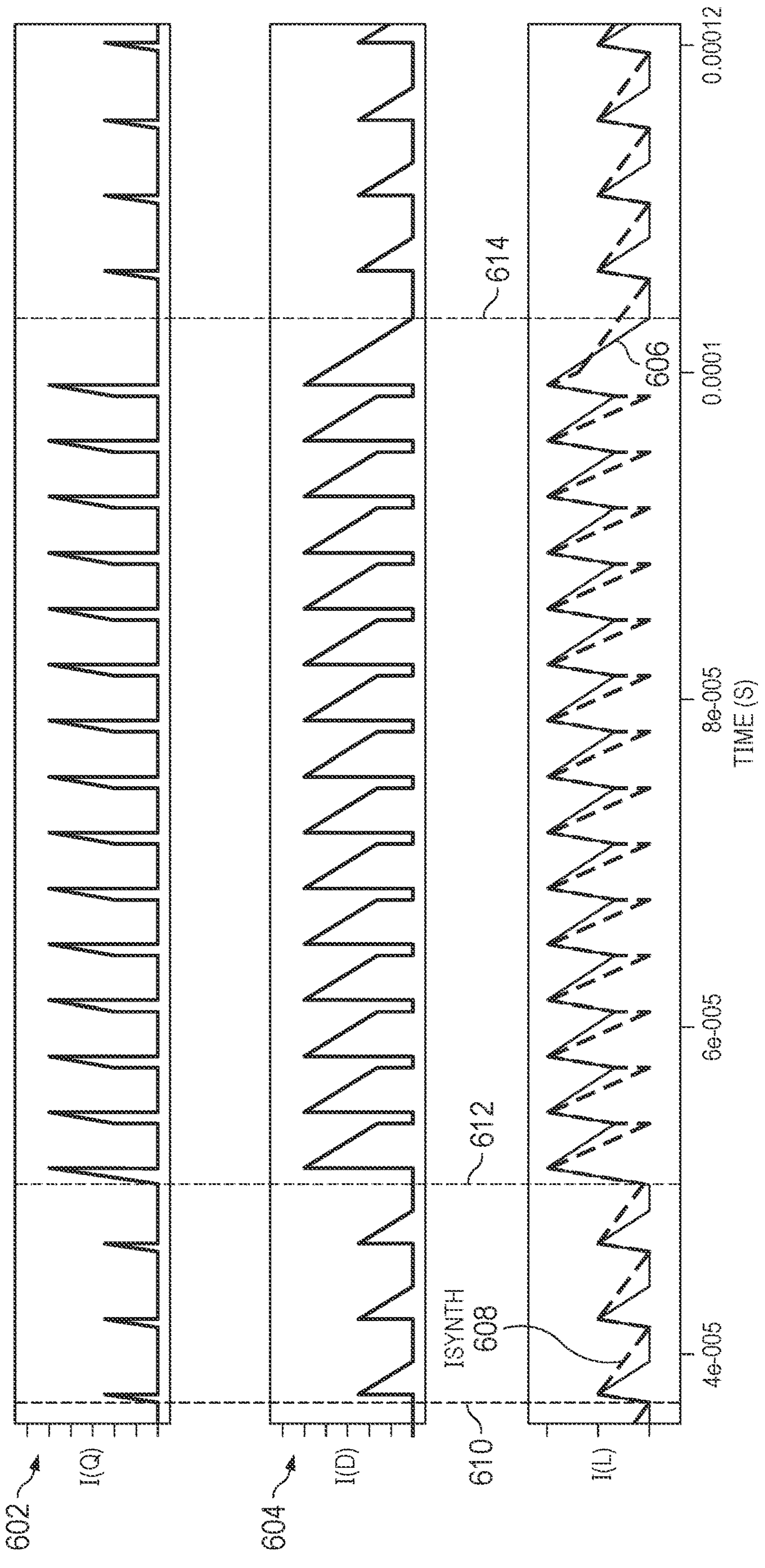
FIG. 6 is a waveform diagram illustrating transitions between DCM and CCM operation of a flyback converter including a PWM controller with a slope control circuit and a peak current control circuit in accordance with some aspects of the present disclosure.

FIG. 6 illustrates an example of a switch current waveform 602, a diode current waveform 604, an inductor current waveform 606, and a synthesized inductor current waveform 608 for a flyback converter (e.g., the flyback converter from FIG. 2) transitioning between DCM and CCM in accordance with some aspects of the present disclosure. In some aspects, the synthesized inductor current waveform 608 is represented as a voltage across the switching capacitor 144.

At a first point in time 610, the converter is operating in DCM, for example, as described with reference to FIG. 3. At a second point in time 612, the converter switches to CCM operation. This may occur in response to a change in the load, for example, as described with reference to the error amplifier 208 of FIG. 2. At a third point in time 614, the converter switches back to DCM operation, for example, in response to the load returning to its original state. The transition between DCM and CCM may occur relatively seamlessly in response to the varying load. The first switch 104 is selectively opened and closed in response to a peak current value being reached and the synthesized current reaching 0 respectively. As a result, the circuit does not require time to adjust when transitioning between CCM and DCM, and the transitions between CCM and DCM are transient free.

Figure 7:
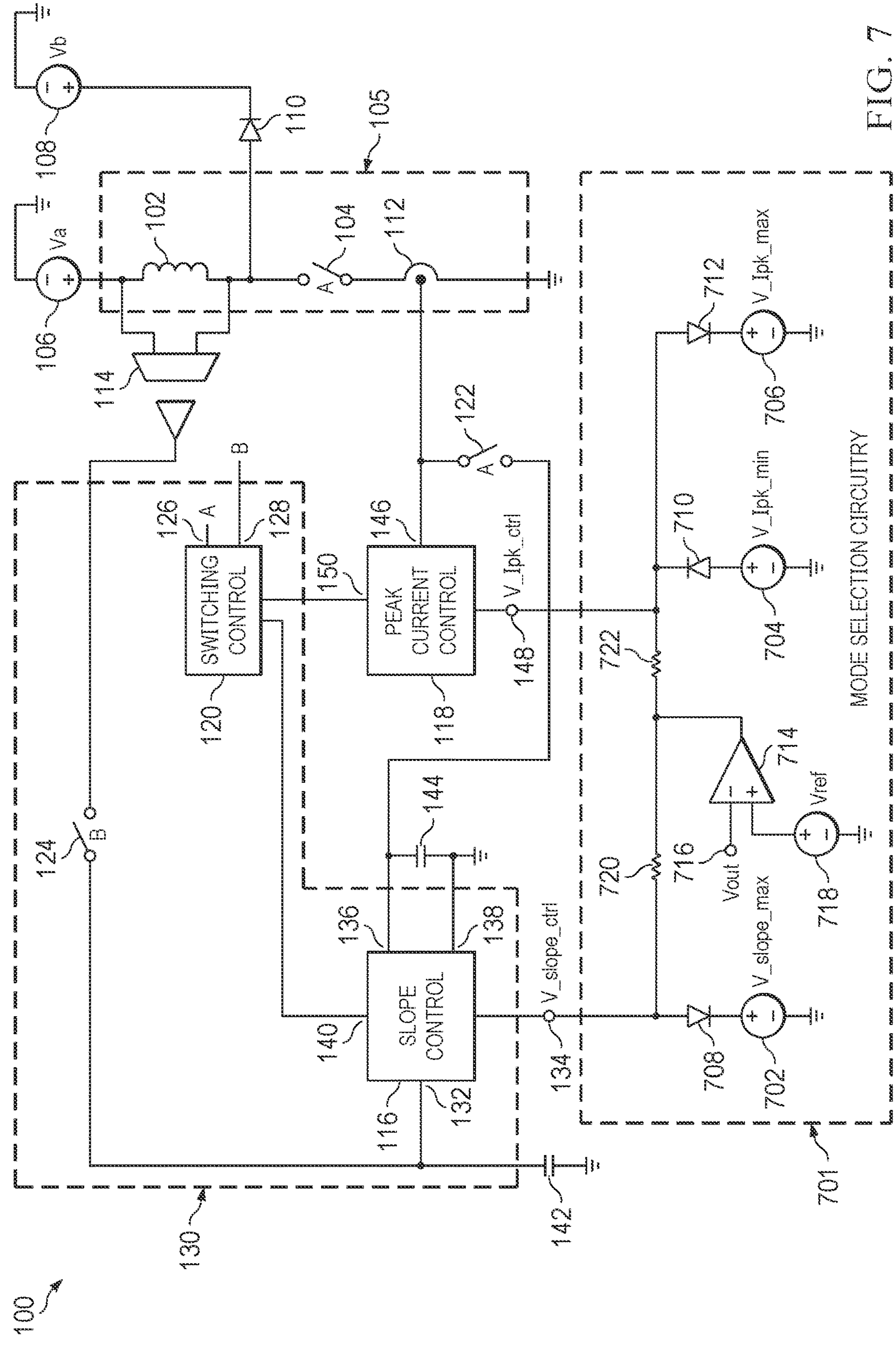
FIG. 7 is a circuit schematic including mode selection circuitry for a PWM controller including a slope control circuit and a peak current control circuit in accordance with some aspects of the present disclosure.

FIG. 7 is a circuit schematic including mode selection circuitry 701 for the PWM controller 100 including a slope control circuit 116 and a peak current control circuit 118 in accordance with some aspects of the present disclosure. In some aspects, the mode selection circuitry 701 is configured to control mode selection (e.g., CCM, DCM, TM) of the PWM converter. The mode selection circuitry 701 includes a maximum-slope-control voltage input 702 having a voltage V_slope_max, a minimum-peak-current-control voltage input 704 having a voltage V_Ipk_min. and a maximum-peak-current-control voltage input having a voltage V_Ipk-_max. The maximum-slope-control voltage input 702 is coupled to the slope-control voltage input terminal 134 via a first diode 708. The minimum-peak-current-control voltage input 704 is coupled to the peak-current-control voltage input terminal 148 via a second diode 710, and the maximum-peak-current control voltage input 706 is coupled to the peak-current-control voltage input terminal 148 via a third diode 712. The circuit further comprises an error amplifier 714 having a first input coupled to an output voltage 716 and a second input coupled to a reference voltage 718. The output voltage 716 may be the output voltage of the PWM converter. An output of the error amplifier 714 is coupled to the slope-control voltage input terminal 134 via a first resistor 720 and coupled to the peak-current-control voltage input terminal 148 via a second resistor 722.

In some aspects, V_Ipk_min<V_Ipk_max<V_slope_max. When the output voltage of the error amplifier 714 drops below V_Ipk_min, the peak current control voltage V_Ipk_ctrl is clamped to V_Ipk_min and only the slope control voltage V_slope_ctrl is allowed to decrease, forcing DCM operation. When the output voltage of the error amplifier 714 increases above V_Ipk_max, the peak current control voltage V_Ipk_ctrl is clamped to V_Ipk_max and only the slope control voltage V_slope_ctrl is allowed to increase, forcing CCM operation. When the output voltage of the error amplifier 714 increases above V_slope_max, the peak current control voltage V_Ipk_ctrl is clamped to V_Ipk_max and the slope control voltage V_slope_ctrl is clamped to V_slope_max, and the converter enters current limit. The present configuration is merely exemplary in order to facilitate a more detailed explanation of the function of the PWM controller 100. Other variations of the mode selection circuitry 701 may be used without departing from the scope of the present disclosure.

Figure 8:
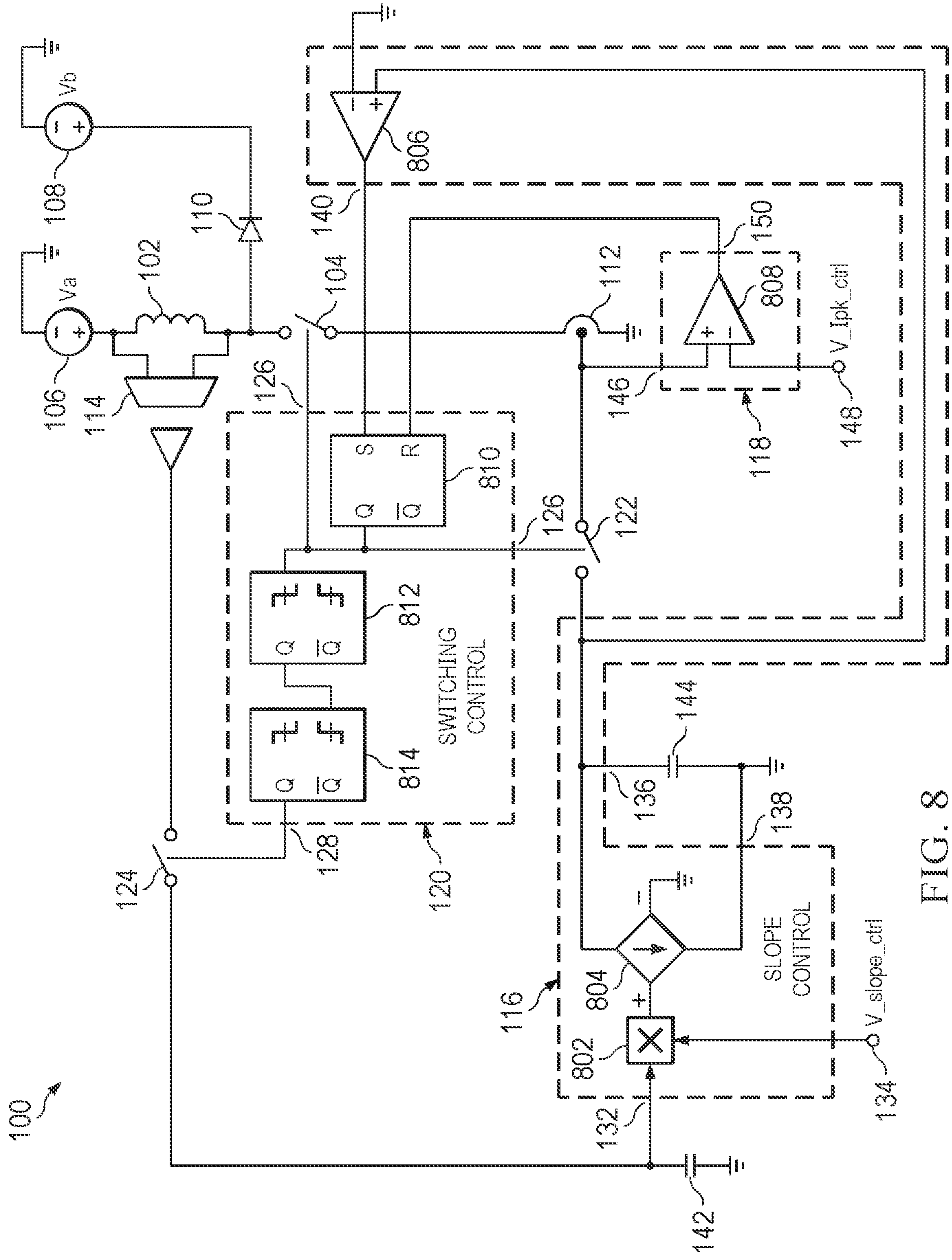
FIG. 8 is a circuit schematic of a PWM controller including a slope control circuit and a peak current control circuit in accordance with some aspects of the present disclosure.

FIG. 8 illustrates the PWM controller 100 from FIG. 1 including the slope control circuit 116, the peak current control circuit 118, and the switching control circuit 120 in accordance with some aspects of the present disclosure.

In some aspects, the slope control circuit 116 comprises a voltage multiplier 802, a transconductance amplifier 804, and a first comparator 806. The first voltage input terminal 132 and the slope-control voltage input terminal 134 are coupled to inputs of the voltage multiplier 802. An output of the voltage multiplier is coupled to an input of the transconductance amplifier 804, and the outputs of the transconductance amplifier 804 are coupled to the first and second terminals of the switching capacitor 144. The transconductance amplifier 804 discharges the switching capacitor at a rate based on a voltage provided at the first voltage input terminal 132 multiplied by V_slope_ctrl. The first comparator 806 comprises first and second inputs coupled to first and second terminals of the switching capacitor 144. When a voltage across the switching capacitor 144 reaches 0 (e.g., the switching capacitor 144 is fully discharged), the first comparator 806 sets the switching output 140 high. As previously described, V_slope_ctrl may be modified to cause the converter to operate in CCM, DCM, or TM.

In some aspects, the peak current control circuit 118 comprises a second comparator 808. The second comparator 808 comprises a first input coupled to the output of the current sensing circuit 112 and a second input coupled to the peak-current-control voltage input terminal 148. The second comparator is configured to set the switching output 150 high when the sensed current exceeds the peak current as indicated by V_Ipk_ctrl.

In some aspects, the switching control circuit 120 comprises an SR latch 810, a first edge triggered pulse generator 812 (e.g., a monostable), and a second edge triggered pulse generator 814. A set input of the SR latch 810 is coupled to the switching output 140, and a reset input of the SR latch is coupled to the switching output 150. When the peak current control circuit 118 sets the switching output 150 high, the SR latch 810 is reset, causing the first switch 104 and the second switch 122 to open (e.g., the discharging mode is initiated). Furthermore, when the SR latch 810 is reset, the falling edge triggers the first edge triggered pulse generator 812. The second edge triggered pulse generator 814 is triggered, causing the third switch 124 to close for a duration of the pulse. The voltage provided by the output of the voltage sensing circuit 114 is "sampled" while the third switch 124 is closed during the pulse, and "held" after the third switch 124 is opened after the pulse. When the slope control circuit 116 sets the switching output 140 high (e.g., when the switching capacitor 144 is fully discharged), the charging phase is initiated by closing the first switch 104 and the second switch 122.

The methods are illustrated and described above as a series of operations or events, but the illustrated ordering of such operations or events is not limiting. For example, some operations or events may occur in different orders and/or concurrently with other operations or events apart from those illustrated and/or described herein. Also, some illustrated operations or events are optional to implement one or more aspects or examples of this description. Further, one or more of the operations or events depicted herein may be performed in one or more separate operations and/or phases. In some examples, the methods described above may be implemented in a computer readable medium using instructions stored in a memory.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device.

For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor, a bipolar junction transistor (BJT—e.g. NPN or PNP), insulated gate bipolar transistors (IGBTs), and/or junction field effect transistor (JFET) may be used in place of or in conjunction with the devices described herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While certain elements of the described examples are included in an integrated circuit and other elements are external to the integrated circuit, in other examples, additional or fewer features may be incorporated into the integrated circuit. Also, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of that parameter. Modifications are possible in the described examples, and other implementations are possible, within the scope of the claims.

What is claimed is:

1. A circuit, comprising:

an inductor having a first terminal and a second terminal;

a current sensing circuit;

a switch coupled between the inductor and the current sensing circuit;

a voltage sensing circuit comprising a first input and a second input coupled to the first terminal and the second terminal of the inductor respectively;

a slope control circuit having a first input, a second input, and a first control output, the first input coupled to an output of the voltage sensing circuit, the slope control circuit configurable to set a slope of a first signal responsive to states of the first and second inputs and provide a second signal responsive to the first signal at the first control output;

a peak current control circuit coupled to an output of the current sensing circuit, the peak current control circuit having a second control output; and a switching control circuit comprising a first input coupled to the first control output of the slope control circuit, a second input coupled to the second control output of the peak current control circuit, and an output coupled to a control terminal of the switch.

2. The circuit of claim 1, further comprising a first capacitor coupled to the first input of the slope control circuit, and the slope control circuit includes a discharge circuit coupled to a second capacitor, the discharge circuit having a control input coupled to the first input of the slope control circuit.

3. The circuit of claim 2, wherein the peak current control circuit further comprises:

a first voltage input terminal, wherein the first voltage input terminal is coupled to the output of the current sensing circuit; and a peak-current-control voltage input terminal.

4. The circuit of claim 3, wherein the switch is a first switch, and the circuit further comprises a second switch coupled between the output of the current sensing circuit and the output of the slope control circuit, wherein a control terminal of the second switch is coupled to the output of the switching control circuit.

5. The circuit of claim 4, further comprising a third switch coupled between the output of the voltage sensing circuit and the first input of the slope control circuit, wherein the output of the switching control circuit is a first output, and a control terminal of the third switch is coupled to a second output of the switching control circuit.

6. The circuit of claim 5, wherein the switching control circuit further comprises:

a set-reset (SR) latch comprising a set input coupled to the first input of the switching control circuit, a reset input coupled to the second input of the switching control circuit, and an output coupled to the first output of the switching control circuit;

a first edge triggered pulse generator comprising an edge triggered input coupled to the output of the SR latch, and an output; and a second edge triggered pulse generator comprising an edge triggered input coupled to the output of the first edge triggered pulse generator, and an output coupled to the second output of the switching control circuit.

7. The circuit of claim 6, wherein the discharge circuit includes:

a voltage multiplier comprising a first input coupled to the first input of the slope control circuit, a second input coupled to the second input of the slope control circuit, and an output; and a transconductance amplifier comprising an input coupled to the output of the voltage multiplier, and first and second outputs coupled across the second capacitor; and the slope control circuit includes a comparator comprising a first input coupled to a terminal of the second capacitor, a second input coupled to a voltage reference, and an output coupled to output of the slope control circuit.

8. The circuit of claim 7, wherein the comparator is a first comparator, and the peak current control circuit further comprises:

a second comparator comprising a first input coupled to the first voltage input terminal of the peak current control circuit, a second input coupled to the peak-current-control voltage input terminal, and an output coupled to the output of the peak current control circuit.

9. The circuit of claim 7, further comprising an error amplifier, wherein an output of the error amplifier is coupled to the second input of the slope control circuit and the peak-current-control voltage input terminal.

10. The circuit of claim 9, wherein the circuit is part of a pulse width modulation (PWM) converter, wherein an output of the PWM converter is coupled to a first input of the error amplifier, and wherein a reference output voltage is coupled to a second input of the error amplifier.

11. The circuit of claim 10, wherein the output of the error amplifier is coupled to the second input of the slope control circuit via a first resistor, wherein the output of the error amplifier is coupled to the peak-current-control voltage input terminal via a second resistor, and wherein the circuit further comprises:

a first diode coupled between the peak-current-control voltage input terminal and a first voltage source configurable to provide a voltage representing a lower limit of a peak current;

a second diode coupled between the peak-current-control voltage input terminal and a second voltage source configurable to provide a voltage representing an upper limit of the peak current; and a third diode coupled between the second input of the slope control circuit and a third voltage source configurable to provide a voltage representing a limit of the second input.

12. A circuit, comprising:

a voltage sensing circuit having an input coupled to a first inductor terminal;

a current sensing circuit;

a switch coupled between a second inductor terminal and the current sensing circuit;

a peak current control circuit having an input coupled to an output of the current sensing circuit, wherein the peak current control circuit is configurable to open the switch via a switching control circuit responsive to a comparison between a first signal at the output of the current sensing circuit and a peak current threshold; and a slope control circuit having a first input and a second input, the first input coupled to an output of the voltage sensing circuit, wherein the slope control circuit is configurable to set a slope of a second signal responsive to states of the first and second inputs of the slope control circuit and to close the switch via the switching control circuit responsive to the second signal of the slope control circuit; wherein, the switch is part of a pulse width modulation (PWM) converter, wherein the PWM converter is configurable to operate in a first mode responsive to the second input of the slope control circuit having a first state, operate in a second mode responsive to the second input of the slope control circuit having a second state, and operate in a third mode responsive to the second input of the slope control circuit having a third state.

13. The circuit of claim 12, further comprising an inductor coupled between the first and second inductor terminals, the inductor being part of the PWM converter, wherein the first mode is a discontinuous conduction mode (DCM), the second mode is a continuous conduction mode (CCM), and the third mode is a transition mode (TM).

14. The circuit of claim 12, wherein the slope control circuit is configurable to provide the first signal via a capacitor, and the slope control circuit is configurable to:

set the slope of the first signal by discharging the capacitor at a rate based on the states of the first and second inputs of the slope control circuit; and selectively close the switch via the switching control circuit in response to the first signal falling below a threshold value.

15. The circuit of claim 14, wherein the switch is a first switch, and the circuit further comprises a second switch coupled between the output of the current sensing circuit and the capacitor, wherein a control terminal of the first switch is coupled to a control terminal of the second switch.

16. The circuit of claim 12, further comprising a first inductor coupled to the first inductor terminal and a second inductor coupled to the second inductor terminal.

17. The circuit of claim 12, further comprising an inductor coupled between the first and second inductor terminals.

18. A method for controlling a pulse width modulation (PWM) converter, comprising:

during a first discharging phase:

sensing a voltage across an inductor and charging a sampling capacitor based on the sensed voltage;

discharging a switching capacitor at a rate based on a voltage stored on the sampling capacitor and a slope-control voltage; and initiating a charging phase in response to a voltage on the switching capacitor falling below a threshold value;

wherein an operation mode of the PWM converter is based on the slope-control voltage.

19. The method of claim 18, wherein the operation mode is one of: discontinuous conduction mode (DCM), continuous conduction mode (CCM), or transition mode (TM).

20. The method of claim 18, further comprising:

during the charging phase:

sensing a current through the inductor and charging the switching capacitor based on the sensed current; and initiating a second discharging phase in response to the sensed current exceeding a peak current threshold value.

21. The method of claim 20, wherein the peak current threshold value is based on a peak-current-control voltage.

* * * * *